United States Patent [19]

Halozan

[11] Patent Number: 5,241,385
[45] Date of Patent: Aug. 31, 1993

[54] TELEVISION SIGNAL TRANSMISSION SYSTEM WITH CARRIER OFFSET COMPENSATION

[75] Inventor: Scott F. Halozan, Des Plaines, Ill.

[73] Assignee: Zenith Electronics Corporation, Glenview, Ill.

[21] Appl. No.: 926,008

[22] Filed: Aug. 5, 1992

Related U.S. Application Data

[63] Continuation-in-part of Ser. No. 667,153, Mar. 11, 1991, Pat. No. 5,181,112.

[51] Int. Cl.$^5$ ............... H04N 7/00; H04N 7/04; H04N 7/13
[52] U.S. Cl. ............... 358/141; 375/18; 375/103; 358/133
[58] Field of Search ............... 358/141, 13, 12, 133, 358/167, 135, 136, 158, 36; 375/25, 34, 18, 26, 103, 27

[56] References Cited

U.S. PATENT DOCUMENTS

| | | | |
|---|---|---|---|
| 3,624,282 | 11/1971 | Salaman et al. | 178/6 |
| 3,792,356 | 2/1974 | Kobayashi et al. | 325/42 |
| 4,011,405 | 3/1977 | Ridout et al. | 178/68 |
| 4,251,886 | 2/1981 | Roza | 375/18 |
| 4,367,495 | 1/1983 | Mita et al. | 360/39 |
| 4,860,317 | 8/1989 | Tomilson | 375/58 |
| 4,875,095 | 10/1989 | Matsumoto et al. | 358/133 |
| 4,918,515 | 4/1990 | Faroudja | 358/11 |
| 5,034,965 | 7/1991 | Kato | 375/27 X |
| 5,040,063 | 8/1991 | Citta et al. | 358/141 |
| 5,040,191 | 8/1991 | Forney, Jr. et al. | 375/39 |
| 5,086,340 | 2/1992 | Citta et al. | 358/141 |
| 5,087,975 | 2/1992 | Citta et al. | 358/183 |
| 5,121,203 | 6/1992 | Citta | 358/141 |
| 5,132,797 | 7/1992 | Citta | 358/167 |

OTHER PUBLICATIONS

"Offset Binary Enhances Control Loop In a PRIV Channel", IBM Technical Disclosure Buletin, vol. 33, No. 12, May 1991, pp. 5–12 and 185–187.

Primary Examiner—James J. Groody
Assistant Examiner—Safet Metjiahic

[57] ABSTRACT

A method of processing a television signal includes providing a digital television signal comprising a plurality of subsegments each including a plurality of N-level symbols and defining a relative transmission level for each of said N levels. The symbols of each of the subsegments are modulo-N offset by an offset factor o-(N−1) selected for insuring that the average relative transmission level for the symbols of each respective subsegment is characterized by a positive level.

15 Claims, 8 Drawing Sheets

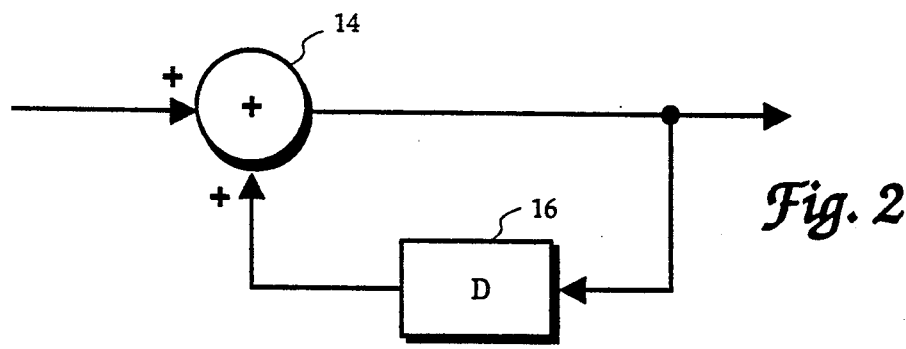
*Fig. 2*
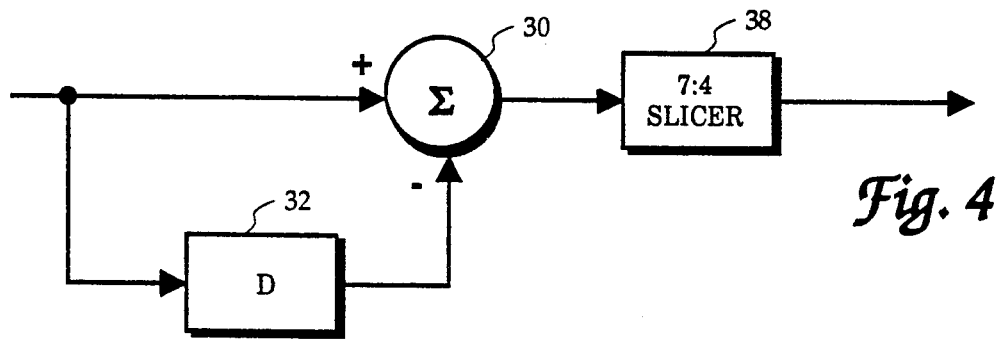
*Fig. 3*
*Fig. 4*
*Fig. 5*
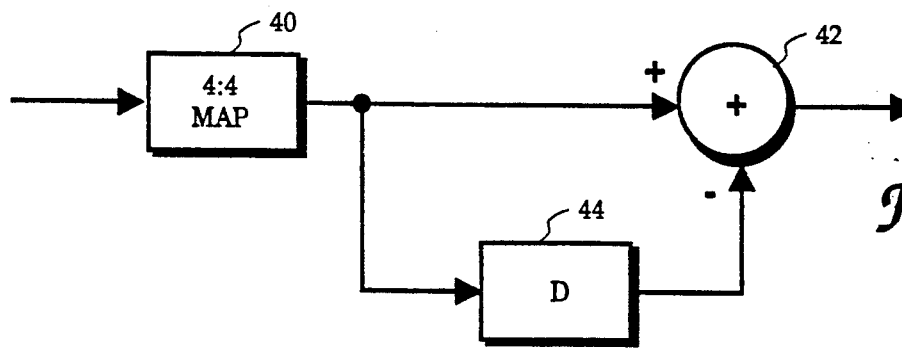
*Fig. 6*

| LEVEL IN | LEVEL OUT |
|---|---|
| 3 | +3.5 |
| 2 | +1.5 |
| 1 | -0.5 |
| 0 | -2.5 |

| LEVEL IN | LEVEL OUT |
|---|---|
| 1 | +2.5 |
| 0 | -1.5 | ically affecting the received HDTV signal. Alterna-
TELEVISION SIGNAL TRANSMISSION SYSTEM WITH CARRIER OFFSET COMPENSATION

CROSS-REFERENCE TO RELATED APPLICATIONS

This application is a Continuation-in-Part of application Ser. No. 667,153, filed Mar. 11, 1991, now U.S. Pat. No. 5,181,112 and is related to U.S. Pat. Nos. 5,086,340, 5,132,797, 5,121,203 and 5,087,975, all of which are assigned to Zenith Electronics Corporation.

BACKGROUND OF THE INVENTION

The present invention relates generally to television signal transmission systems and particularly concerns digital television signal transmission systems employing fully or partially suppressed carriers.

U.S. Pat. Nos. 5,086,340 and 5,087,975 disclose a television signal transmission system for transmitting and receiving a digital HDTV video signal over a standard 6 MH$_z$ television channel without excessive interference from an NTSC co-channel signal. The video signal is processed in the transmitter using a modulo-N precoding filter to facilitate the use of a complementary postcoding linear filter in the receiver to substantially cancel interfering NTSC co-channel beats without significantly affecting the received HDTV signal. Alternatively, in the absence of NTSC co-channel interference, the received signal may be processed by a complementary modulo-N postcoding filter which has better signal-to-noise performance than the linear postcoding filter.

In order to minimize the possibility of the HDTV transmission from interfering into an NTSC co-channel, it is desirable to transmit the HDTV signal using a suppressed carrier format or, alternatively, in conjunction with a relatively small pilot component. In either event, accommodations must be made to allow for proper reception of the transmitted signal. In particular, satisfactory receiver lock-up may be substantially enhanced by insuring that the average carrier level of the transmitted signal is characterized by at least a selected predetermined value. The digital video data itself is characterized by generally randomly occurring levels both above and below the zero carrier level and thus would normally provide a substantially zero average carrier level at the receiver. The system of the application referred to above included a quadrature pilot component at the carrier frequency to overcome this deficiency. However, for various reasons, it may be desirable to instead use an in-phase pilot component or, for that matter, no pilot component at all. In either of these cases, receiver lock-up may become a problem; in the former case because digital video data below the zero carrier level may cancel the pilot and in the latter case because of the randomly occurring nature of the digital video data above and below the zero carrier level.

It is therefore a basic object of the present invention to provide an improved digital television signal transmission system.

It is a more specific object of the invention to provide a digital television signal transmission system employing a relatively small in-phase pilot component or no pilot component at all.

It is another object of the invention to provide a digital television signal transmission system employing a relatively small in-phase pilot component or no pilot component at all and in which a digital video signal is coded in the transmitter by a modulo-N precoding filter and the received signal is processed by either a complementary linear postcoding filter or by a complementary modulo-N postcoding filter.

It is yet a further object of the invention to provide a television signal transmission system of the foregoing type wherein receiver performance is not substantially degraded by transmission errors.

BRIEF DESCRIPTION OF THE DRAWINGS

These and other objects and advantages of the invention will be apparent upon reading the following description in conjunction with the drawings, in which:

FIG. 2 is a block diagram of a modulo feedback precoding filter useful in explaining the operation of the encoder of the invention;

FIG. 3 is a level conversion table used in the encoder of the invention;

FIG. 4 is a block diagram of a linear feedforward postcoding filter useful in explaining the operation of the receiver of the invention;

FIG. 5 is a level conversion table used in the receiver of the invention;

FIG. 6 is a block diagram of a modulo feedforward postcoding filter useful in explaining the operation of the receiver of the invention;

DESCRIPTION OF THE PREFERRED EMBODIMENTS

The principles of the invention will initially be explained in connection with the numerical examples set forth in FIGS. 1A–1M and the related simplified circuits and tables shown in FIGS. 2–6. Thereafter, specific embodiments illustrating the application of these principles to a television signal transmission system will be provided.

Figure 1A:
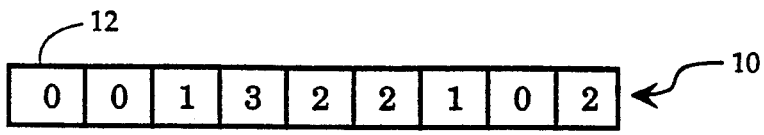
FIGS. 1A–1M present a numerical example illustrating the principles of the invention.

Referring, therefore, now to the drawings, an exemplary video related digital data segment 10 is illustrated in FIG. 1A. The data segment 10 comprises nine symbols, each of which may assume any one of the four levels 3-2-1-0. The last eight symbols of data segment 10 represent video related data generated by a suitable video processor, the first symbol 12 comprising a special offset symbol whose function will be described in further detail hereinafter. It will be understood that data segment 10 may comprise more or less symbols than that shown in the drawing and may represent any type of video signal such as a spatially and/or a temporally processed HDTV video signal. Also, it is within the scope of the invention to use symbols which may assume more or less than the four levels contemplated herein.

Figure 1B:
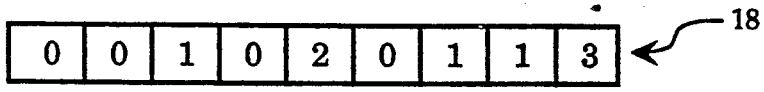
Figure 1C:
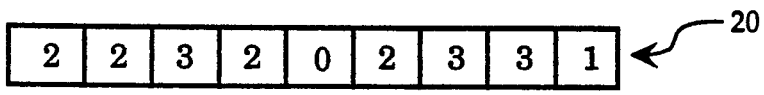
Figure 1D:
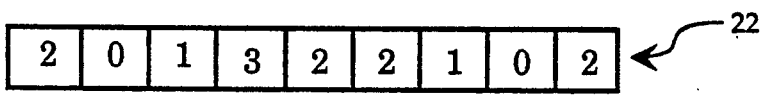

As explained in the referent copending applications, the video related data segment 10 is initially precoded by a modulo-N filter prior to transmission to facilitate the use of a complementary postcoding linear filter in a receiver for reducing any NTSC co-channel interference. A complementary modulo-N postcoding filter may alternatively be used to process the received signal in the absence of NTSC co-channel interference. An exemplary modulo-N precoding filter is shown in simplified block diagram form in FIG. 2 and will be seen to comprise a feedback filter including an input modulo-N adder 14 and a feedback delay element 16 having a delay corresponding to the temporal spacing of the data segment symbols. Application of data segment 10 to the precoding filter of FIG. 2 results in an output precoded data segment 18 as shown in FIG. 1B. In this regard, it will be understood that adder 14 employs modulo-4 addition in the derivation of precoded data segment 18.

As mentioned previously, the suppressed carrier transmission of a signal corresponding to precoded data segment 18, which is generally randomly occurring in nature, may result in substantial portions of the transmission being below the zero carrier level, even if an in-phase pilot component is utilized. This may increase the difficulty of proper receiver lock-up when traditional phase lock loop is employed. To overcome this deficiency, the invention provides a technique for delivering a signal to the receiver, the majority part of which comprises a predetermined positive or negative level of carrier signal. In particular, in a preferred embodiment of the invention the precoded data segment 18 is further processed prior to transmission such that the most often occurring symbol transmission level is caused to assume a selected value whereby a majority of the symbols of the data segment are arranged to assume a positive level. As will be seen hereinafter, the four data levels 3-2-1-0- characterizing precoded data segment 18 are translated to four respective corresponding levels such as 3-1-(-1)-(-3) or 4-2-0-(-2) prior to transmission. According to a preferred embodiment of the present invention, the selected value corresponds to the minimum positive level of either of the four latter levels, i.e., level 1 or level 2, which level corresponds to level 2 of precoded data segment 18. Use of the minimum positive transmission level as the selected value provides for improved receiver lock-up as described above (i.e. by forcing a majority of the symbols of the transmitted data segment to assume a non-negative level) while introducing less interference into a potential NTSC co-channel than if the maximum positive level was chosen as the selected level.

Figure 1E:
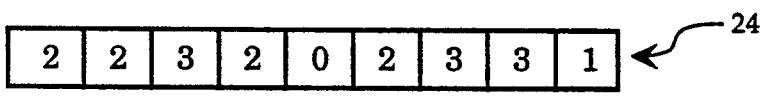

In accordance with the foregoing, the precoded data segment 18 is initially analyzed to determine the number of symbols characterized by each of the four levels 3-2-1-0. Referring to FIG. 1B, it will be seen that one (1) of the symbols is characterized by a 3-level, one (1) by a 2-level, three (3) by a 1-level and four (4) by a 0-level. The maximum or most often occurring level of the symbols of data segment 18 is therefore a 0-level, while the desired maximum occurring level (i.e., the selected level) is a 2-level. In accordance with one aspect of the invention, each symbol of precoded data segment 18, including offset symbol 12, is therefore offset in modulo-4 by a factor of 2 to derive the modified data segment 20 shown in FIG. 1C. Examination of data segment 20 reveals that the maximum occurring symbol level is a 2-level as desired. Alternatively, the same effect can be achieved by setting offset symbol 12 of data segment 10 to a 2-level to derive a data segment 22 (see FIG. 1D) and precoding the result using the filter of FIG. 2 to generate a modified data segment 24 as shown in FIG. 1E. In this regard, it will be observed that modified data segments 20 and 24 are identical since they were derived by respective operations that are mathematically equivalent.

Figure 1F:
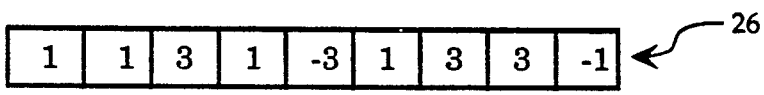
Figure 1G:
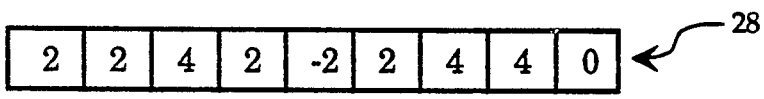

Modified data segment 20, 24 is next preferably mapped according to the mapping table of FIG. 3 to derive a data segment 26 as shown in FIG. 1F which is more suitable for transmission. Finally, an in-phase pilot component may be added to data segment 26 which has the effect of DC offsetting each symbol by, for example, one unit to generate a data segment 28 as shown in FIG. 1G. Data segment 26 or 28, the majority of the symbols of which are desirably at the minimum positive level of (+1) or (+2) respectively, is subsequently transmitted for reception by an appropriate receiver.

Figure 1H:
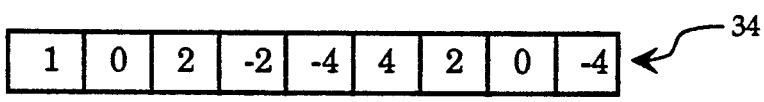
Figure 1I:
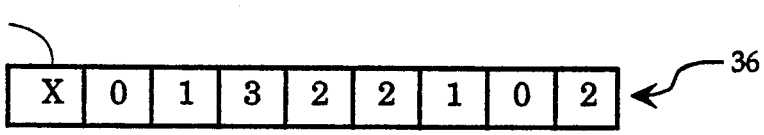

In the receiver, received data segment 26 or 28, depending on whether a pilot is or is not used, is processed by a linear postcoding filter as shown in FIG. 4 to cancel NTSC co-channel interference as explained in the referent copending applications. Although it is not necessary, the pilot component may be subtracted from data segment 28 (resulting in a data segment equivalent to data segment 26) before applying the received signal to the postcoding linear filter of FIG. 4. The filter of FIG. 4 comprises a feedforward filter including a linear adder 30 and a feedforward delay path comprising a delay element 32 having a delay corresponding to the temporal spacing of the received data symbols. Adder 30 linearly subtracts the immediately previous symbol of received data segment 26 or 28 from each current symbol to derive a 7-level intermediate data segment 34 as shown in FIG. 1H at its output. The 7-level intermediate data segment 34 developed at the output of adder 30 is subsequently converted to a corresponding 4-level data segment 36 as shown in FIG. 1I by a 7:4 level slicer 38. Slicer 38 may implement a symbol conversion table as shown in FIG. 5. It will be observed that, except for the offset symbol 12 which is discarded in the receiver, data segment 36 derived in the receiver is identical to the original video related data segment 10. Advantageously, through the use of offset symbol 12 as described above, data segment 36 is suitably recoverable in the receiver solely using the postcoding arrangement of FIG. 4, which is necessary in any event to reduce co-channel NTSC interference.

Figure 1J:
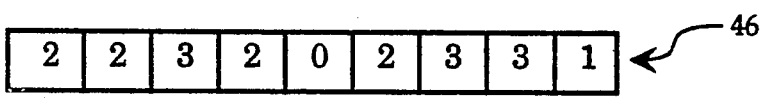

As mentioned previously, in the absence of significant NTSC co-channel interference, received data segment 26 or 28 may be postcoded in the receiver by a complementary modulo filter to provide improved noise performance. Such an arrangement is illustrated in FIG. 6 and will be seen to comprise an input 4:4 mapper 40 whose output supplies the positive input of a modulo adder 42 and a one symbol delay element 44. Mapper 40, which implements the reverse mapping function illustrated in the table of FIG. 3, maps received data segment 26 (or the equivalent comprising data segment 28 with the pilot component removed) into intermediate data segment 46 as shown in FIG. 1J. This data segment is then processed by the filter comprising modulo adder 42 and delay 44 to provide the properly decoded data segment 48 as shown in FIG. 1K, where again the offset symbol 12 is discarded.

Another feature of the present invention resides in the performance of the system in response to transmission errors. In particular, due to the use of feedforward postcoding arrangements in the receiver filters, an error in the transmission of any symbol, including the offset symbol, will result in the creation of only one additional symbol error. That is, the transmission error will not effect the entire data segment but only the symbol received after the symbol in error. This is illustrated by the data segments 50 and 52 shown in FIGS. 1L and 1M respectively. Data segment 50 corresponds to received data segment 28 except that the offset symbol has erroneously been received at a 3-level instead of the correct 2-level. Postcoded data segment 52 reflects the error in the offset symbol and in the next symbol which is reproduced at level-1 instead of at level-0. However, quite significantly, no other errors are created in the reproduced data segment.

The principles of the invention generally described above may be implemented in various embodiments, some of which are described in detail below. In all of these embodiments, the delay characterizing the delay element used in the precoding and postcoding filters preferably corresponds to twelve (12) data symbols to facilitate reduction of co-channel NTSC interference components in the receiver as disclosed in U.S. Pat. No. 5,087,975. As a consequence, the input 4-level video related digital data may be advantageously provided in the form of twelve interleaved or interspersed subsegments, each respective subsegment comprising a plurality of symbols spaced from each other by twelve sample intervals. Thus, since the spacing between subsegment symbols corresponds to the filter delay, the processing of each individual subsegment conforms to the numerical example given above.

Figure 7:
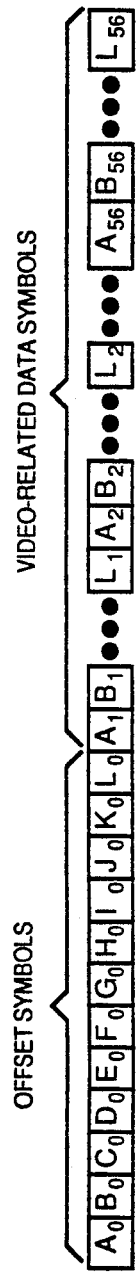
FIG. 7 illustrates the manner in which a horizontal line of video related data is formatted into a plurality of subsegments according to a preferred embodiment of the invention.

In accordance with the foregoing, the input data is preferably formatted for transmission as a plurality of horizontal lines of interspersed subsegments as illustrated in FIG. 7. As shown, each horizontal line or segment may comprise about 684 symbols comprising twelve interspersed subsegments A-L of 4-level video related data symbols. Each subsegment A-L comprises 57 symbols separated from each other by twelve symbol intervals. Thus, for example, subsegment A comprises symbols $A_0$-$A_{56}$, subsegment B symbols $B_0$-$B_{56}$, and so on. The first symbol $A_0$-$L_0$ of each subsegment comprises the offset symbol for the respective subsegment, with the remaining symbols representing video related data, except for the last four symbols of each segment which may represent a horizontal sync character. As mentioned above, formatting the input data in this manner allows each subsegment to be processed in accordance with the principles previously set forth.

Alternatively, and as more fully described in application Ser. No. 872,211, filed Apr. 22, 1992, each subsequent A-L may comprise either 4-level video related data symbols as described above or 2-level symbols. The 2-level symbols, while providing a reduced data rate, offer improved S/N performance relative to the 4-level symbols. The levels of the 2-level symbols may comprise a subset of the levels of the 4-level symbols (e.g. levels $-2$ and 2 of the four levels $-2, 0, 2, 4$) but, preferably comprise levels intermediate the two uppermost and two lowermost levels respectively of the four level symbols (e.g. levels 3 and $-1$). The use of these levels afford the advantage of establishing an average relative pilot of 1 for both 2 and 4-level symbols. That is, $(3-1)/2=1$ and $(4+2+0-2)/4=1$. Also, it has been found convenient to configure the data segments such that each pair of adjacent segments is entirely constituted by either 2-level or 4-level video related data symbols.

Figures 13A, 13B, 15:
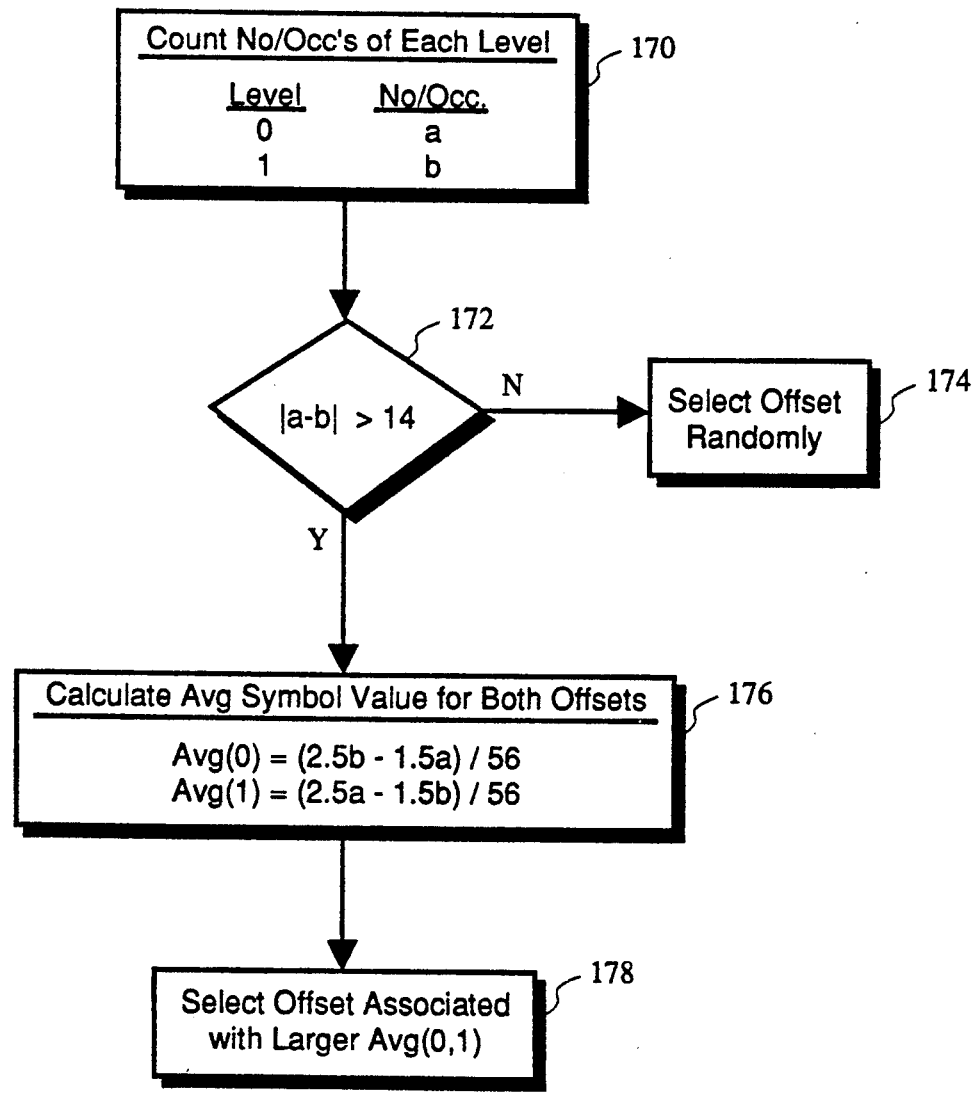
FIGS. 13A and 13B are alternate level conversion tables useful in the encoder of the invention.
FIG. 15 is a flow chart illustrating another algorithm useful in selecting offset values in accordance with the invention.

As a further alternative it may be desirable to reduce the average relative pilot by adjusting the relative transmission levels as illustrated in FIGS. 13A and 13B. Considering the 4-level case first, the input levels 0,1,2,3 would be mapped to relative output transmission levels $-2.5, -0.5, 1.5, 3.5$ respectively as shown in FIG. 13A. In the 2-level case mapper the input levels 0, 1 would be mapped to relative output transmission levels $-1.5, 2.5$ respectively as shown in FIG. 13B. It will be appreciated that the average relative pilot in both cases is 0.5; $(3.5+1.5-0.5-2.5)/4=0.5$ and $(2.5-1.5)/2=0.5$.

Figure 8:
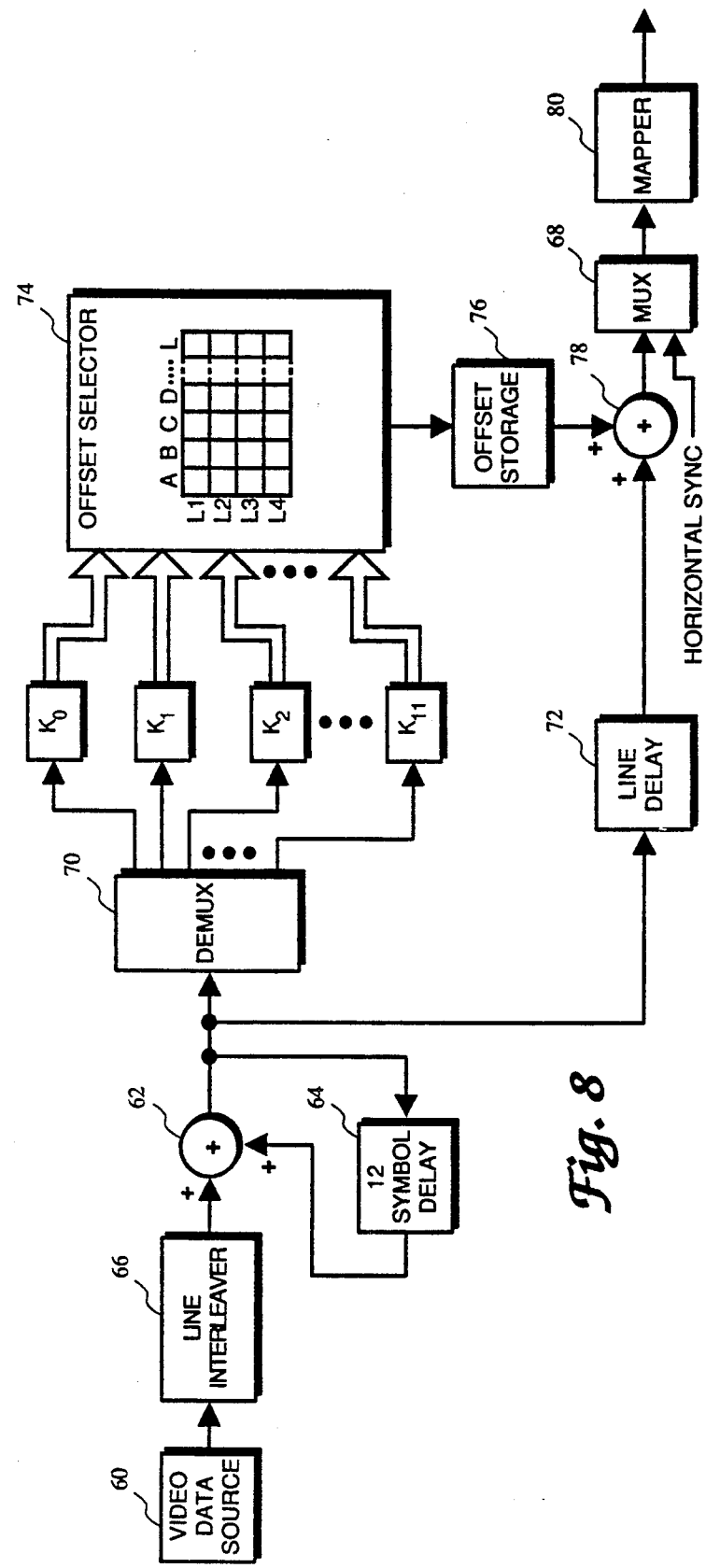
FIGS. 8–10 are block diagrams of three embodiments of the invention.

Referring now to FIG. 8, which illustrates a first embodiment of an encoder constructed according to the invention, a video data source 60 supplies a line interleaver 66 which provides a video related data signal formatted in a series of successive horizontal lines as illustrated in FIG. 7. The data signal is initially precoded by a filter comprising a modulo-4 adder 62 and a 12-symbol feedback delay element 64. The output of modulo-4 adder 62 thus comprises twelve precoded subsegments, each corresponding to the precoded data segment 18 of FIG. 1B.

The output of modulo-4 adder 62 is applied to a demultiplexer 70 and to the input of a one horizontal line delay 72. Demultiplexer 70 separates the twelve precoded subsegments A-L and couples each to the input of a respective subsegment counter group $K$-$K_{11}$. Each of the subsegment counter groups $K_0$-$K_{11}$ preferably comprises four counters for counting the number of symbols in a respective subsegment characterized by each of the four possible levels 3-2-1-0 (only two of the counters would be used if the subsegment comprised 2-level symbols). The four symbol counts thusly accumulated for each subsegment by a respective one of the subsegment counter groups $K_0$-$K_{11}$ are applied to an offset selector 74 which executes an algorithm for determining the offset symbol for each data subsegment. While various algorithms may be utilized for this purpose, one such algorithm includes determining for each precoded subsegment the level at which the greatest number of symbols occur and then deriving a modulo-4 offset for translating this level to a selected level, which preferably, although not necessarily, comprises the least positive relative symbol transmission level. The twelve derived offset values, one for each subsegment, are coupled from offset selector 74 for storage in an offset memory 76. The output of memory 76 is then applied to a modulo-4 adder 78 where the stored offset value for each respective subsegment is added to each symbol thereof, including the offset symbol. The result of this operation corresponds to the development of data segment 20 of FIG. 1C. A multiplexer 68 is coupled to the output of adder 78 and is operable for coupling a fixed sequence of four symbols comprising a horizontal sync character during the sync interval for each data segment and is otherwise operable for coupling the output of adder 78. Finally, the output of multiplexer 68 is applied to a mapper 80 which executes the mapping function of the table of FIG. 3 (or that of the tables of FIGS. 13A and 13B) to provide output subsegments corresponding to data segment 26 of FIG. 1F.

Figure 9:
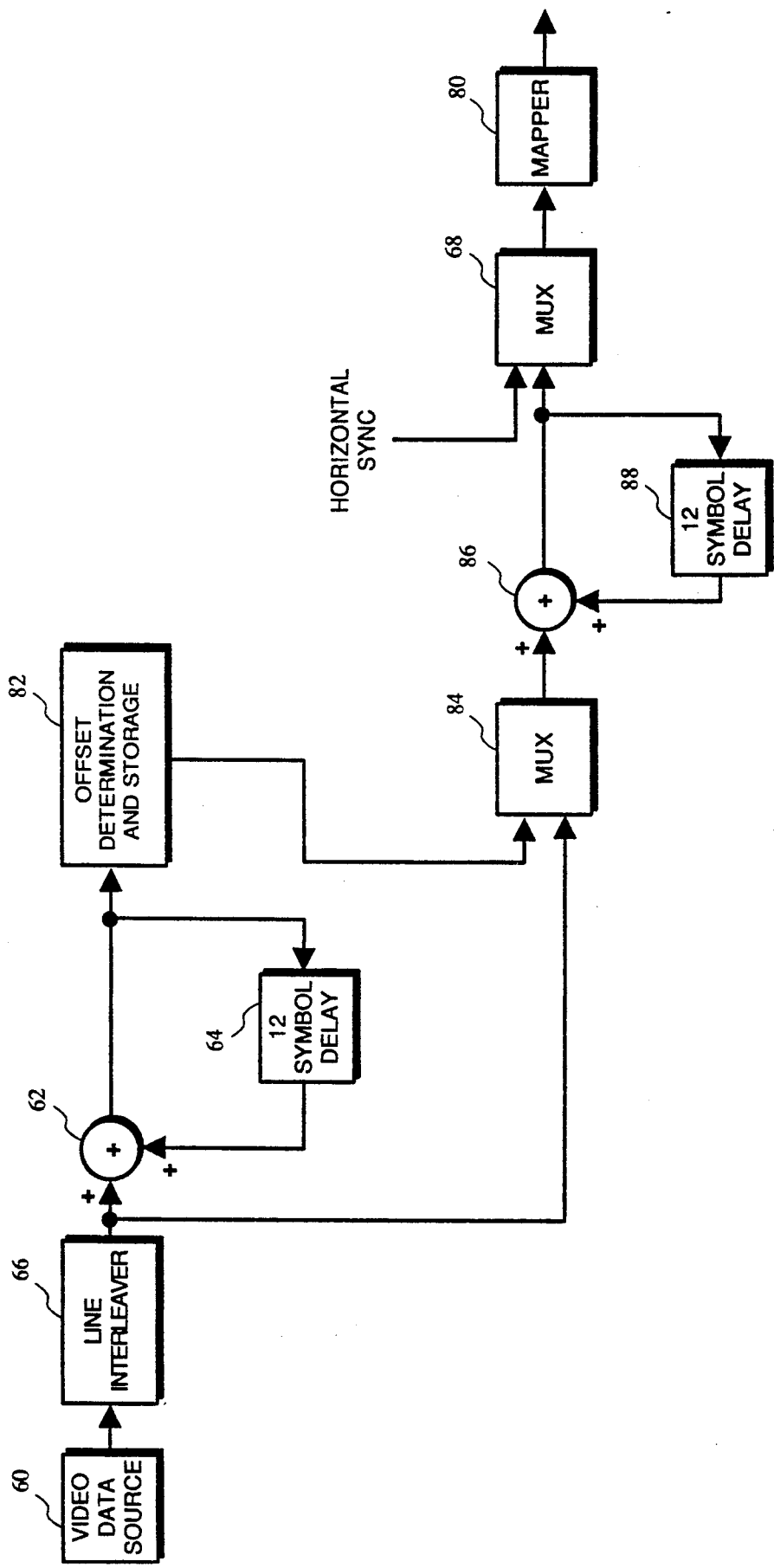

An alternate embodiment which provides an equivalent result is illustrated in FIG. 9. The interspersed data subsegments are again provided by line interleaver 66 and precoded as in the embodiment of FIG. 8. The precoded subsegments are then applied to an offset determination and storage unit 82 corresponding to demultiplexer 70, subsegment counter groups K-$K_{11}$, offset selector 74 and offset storage 76 of FIG. 8. The twelve offset values derived by unit 82 for the input precoded subsegments are applied to one input of a multiplexer 84, the other input of which is coupled to the output of line interleaver 66. Multiplexer 84 is operated to initially couple the twelve offset symbol values $A_0$-$L_0$ from unit 82 to its output followed by the remaining subsegment symbols $A_1$-$L_{56}$ from source 60. The output of multiplexer 84 therefore corresponds to data segment 22 of FIG. 1D in which each subsegment from line interleaver 66 is modified by insertion of the appropriate offset symbol. The modified subsegments are then precoded by a second precoding filter comprising a modulo-4 adder 86 and a twelve symbol delay element 88 to provide a plurality of offset compensated precoded subsegments, each corresponding to data segment 24 of FIG. 1E. A multiplexer 68 is coupled to the output of adder 86 to allow insertion of the four symbol horizontal sync character. Finally, the output of multiplexer 68, which is equivalent to the output of multiplexer 68 of FIG. 8, is applied to mapper 80 which executes the mapping table of FIG. 3, FIG. 13A or FIG. 13B.

Figure 10:
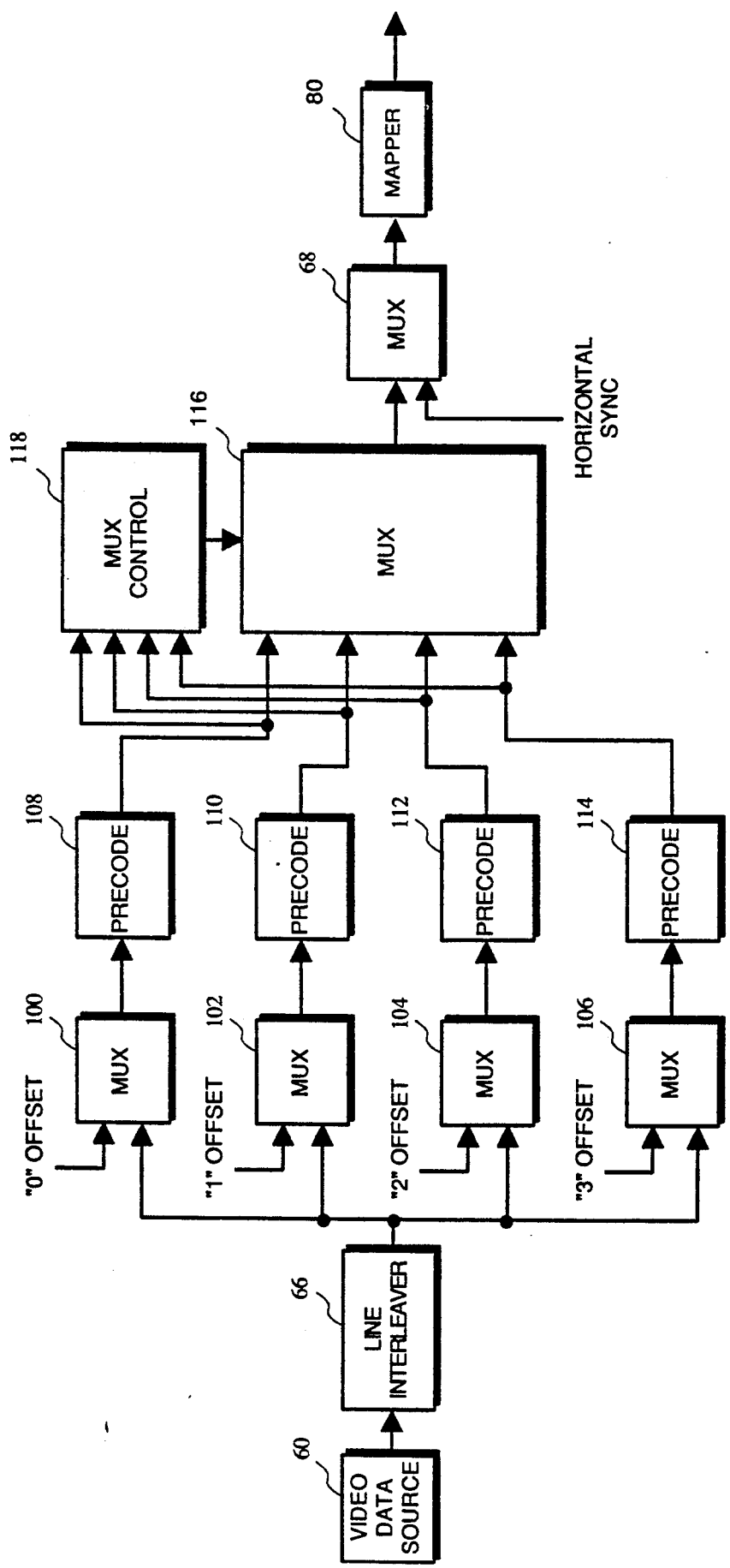

A further embodiment of the invention is illustrated in FIG. 10. In this case, the output of line interleaver 66 is applied to one input of each of four multiplexers 100, 102, 104 and 106. The second input of multiplexer 100 is supplied with a 0-level offset symbol such that the output of the multiplexer comprises the twelve data subsegments with each of the twelve offset symbols set to the 0-level. Similarly, the second inputs of multiplexers 102, 104 and 106 are supplied with 1-level, 2-level and 3-level offset symbols respectively such that their outputs each reflect the input data subsegments, but each with its twelve offset symbols set to either a 1-level (multiplexer 102), a 2-level (multiplexer 104) or a 3-level (multiplexer 106). The outputs of multiplexers 100-106 are then each precoded by a respective precoding filter 108-114 and coupled thereby to the inputs of an output multiplexer 116 and a multiplexer control unit 118.

Multiplexer control unit 118 analyzes the four precoded versions of each of the twelve subsegments and identifies the precoded version of each subsegment having the greatest number of symbols occurring at the minimum positive transmitted symbol level. Based on this analysis, control unit 118 then operates multiplexer 116 for coupling only the identified versions of the precoded subsegments to a horizontal multiplexer 68 whose output, therefore, is equivalent to the outputs produced by multiplexers of FIGS. 8 and 9 respectively. As in the previous embodiments, the output of multiplexer 116 is mapped by mapper 80 according to the table of FIG. 3. Also, as previously indicated, other algorithms can be utilized by control unit 118 for controlling the operation of multiplexer 116.

Figure 11:
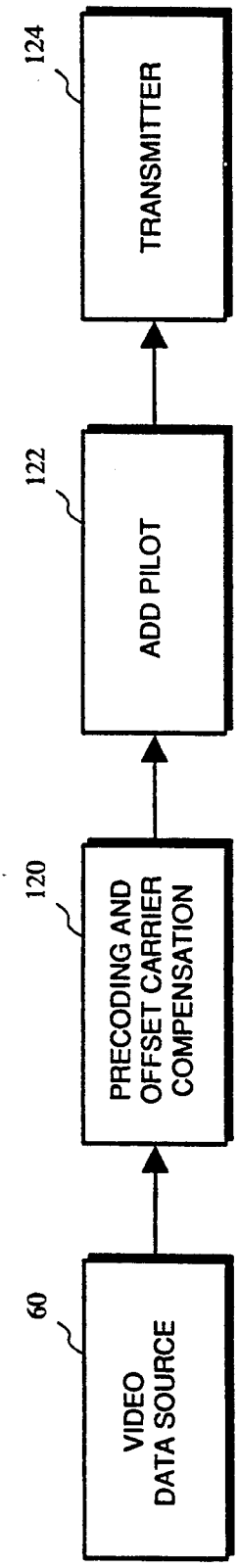
FIG. 11 is a simplified block diagram of a television signal transmitter incorporating the embodiments of FIGS. 8–10.

Referring now to FIG. 11, a block 120 represents any of the precoding and carrier offset compensation embodiments of FIGS. 8-10. As discussed previously, the output of this block corresponds, for each of the twelve interspersed data subsegments A-L, to data segment 26 of FIG. 1F. Advantageously, each subsegment is preferably encoded such that the largest number of symbols thereof occur at the least positive symbol level, i.e. level +1. This insures that the majority of the output signal will be above the zero carrier level thereby greatly facilitating receiver lock-up of the transmitted signal. Receiver lock-up can be further enhanced by adding an in-phase pilot to the output of block 120 as illustrated at 122. Addition of the pilot effectively introduces a DC offset of one unit to the output of block 120 as represented by data segment 28 of FIG. 1G.

Finally, the output of block 122 is applied to a transmitter 124 for transmission of the encoded data segments over a standard 6 MHz television channel.

Figure 14:
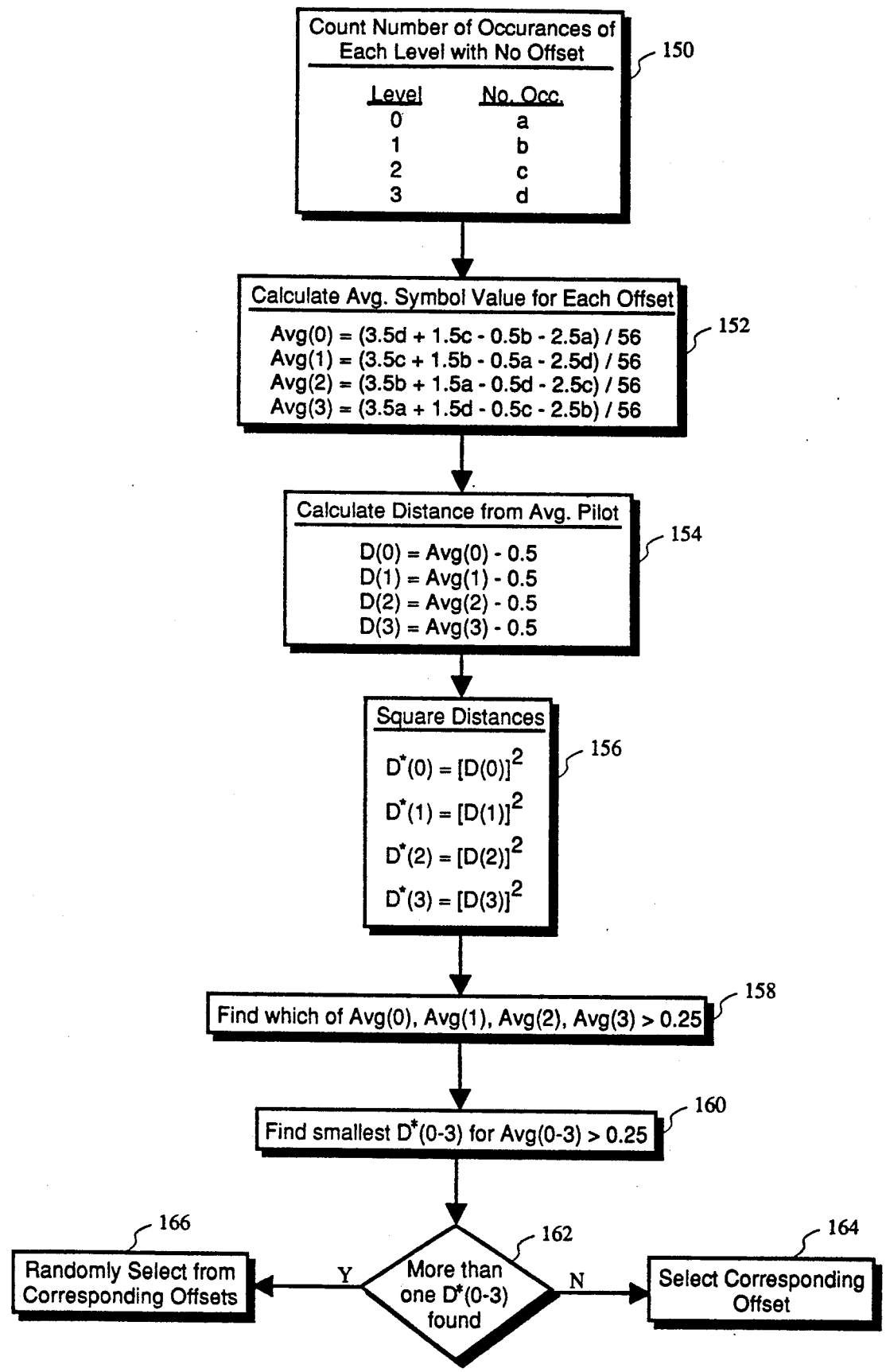
FIG. 14 is a flow chart illustrating an algorithm useful in selecting offset values in accordance with the invention.

An alternative algorithm which may be used by units 74, 82 and 118 (see FIGS. 8, 9 and 10) for deriving the offset factors for 4-level symbols is illustrated in FIG. 14. In essence, this algorithm selects the offset value for each subsegment such that its relative transmission levels are characterized by an average positive value (or an average positive value exceeding a predetermined threshold) whose distance from the pilot is a minimum. While the algorithm will be explained below in connection with relative transmission levels −2.5, −0.5, 1.5 and 3.5 (pilot=0.5), it will be appreciated that it is equally applicable to other values of relative transmission levels.

Referring therefore now to FIG. 14, the number of occurrences of each level 0,1,2 and 3 of the precoded symbols of a respective subsegment with no (i.e. "o") offset applied are initially counted in a step 150. A count a is therefore developed representing the number of occurrences in the subsegment of level 0 symbols, a count b representing the number of occurrences of level 1 symbols, a count c representing the number of occurrences of level 2 symbols and a count d representing the number of occurrences of level 3 symbols (all assumming 0 offset). Next, in a step 152, the average relative transmitted symbol value (assuming relative transmission levels −2.5, −0.5, 1.5 and 3.5) for the subsegment is calculated for each of the four possible offset values 0-3. Since the offset values are combined with the subsegment symbols using modulo-4 arithmetic, the average values can be conveniently calculated by successively rotating the counts a,b,c and d used in the averaging equation as shown in the Figure. In step 154 each average value Avg(0), Avg.(1), Avg.(2) and Avg(3) is decremented by a factor of 0.5 (the average pilot) to derive its respective distance D(0), D(1), D(2) and D(3) from the pilot. The four distance values D(0), D(1), D(2) and D(3) are subsequently squared in a step 156 to derive positive distance values D*(0), D*(1), D*(2) and D*(3).

The algorithm next executes a routine represented by a step 158 in which the average values calculated in step 152 are analyzed to identify those which exceed a predetermined threshold value. In a presently preferred embodiment the threshold is set at one-half the average pilot (i.e. 0.25), but may take any value between 0 and 0.5 (i.e. the average pilot). All positive average values would be identified in step 158 if the threshold were set to 0 and all average values exceeding the pilot would be identified if the threshold were set to 0.5. Setting the threshold at 0.25 is a compromise between these two extremes. The smallest of the distances D*(0), D*(1), D*(2) and D*(3) corresponding to the average values identified in step 158 are next identified in a step 160. If only one such distance is identified (see step 162), the offset corresponding to that distance is selected for use in a step 164. If, however, more than one of the distances are identified, then the offset corresponding to a randomly selected one of such identified distances is selected for use in a step 166.

It will therefore be seen that the algorithm shown in FIG. 14 selects an offset value such that the relative transmission levels of the respective subsegment are characterized by an average value exceeding 0.25 (one-half the pilot) and whose distance from the pilot is a minimum. If more than one offset satisfies these criteria, then a random selection is made from among such offsets.

FIG. 15 illustrates an algorithm for use with 2-level symbols, the specific embodiment being again set forth for the case of an average pilot of 0.5 (i.e. relative transmission levels 2.5 and −1.5) but which is also equally applicable to other values of relative transmission levels. The strategy implemented by this algorithm is to randomly select one of the two possible offsets 0–1 if the occurrences of the two levels of a respective subsegment are relatively equally split and to otherwise select the offset which would produce the largest relative average transmitted symbol value for the subsegment.

Referring to FIG. 15, the number of occurrences of each level 0, 1 of a respective precoded subsegment with no offset applied are initially counted in a step 170. A count a is therefore developed representing the number of occurrences in the subsegment of level 0 symbols and a count b is developed representing the number of occurrences of level 1 symbols. If the difference between counts a and b is less than or equal to a selected threshold (e.g. 14 in step 172 of the figure), an offset is randomly selected for use from the possible offsets 0,1 in a step 174. On the other hand, if the difference between a and b is greater than 14, the average relative transmission levels of the respective subsegments is calculated for both offsets in a step 176. Finally, in a step 178, the offset corresponding to the larger of the average values calculated in step 176 is selected for use in a step 178. It will thus be seen that if the occurrences of the two levels in a respective subsegment are relatively equally split (e.g. within 14 of each other in the preferred embodiment) an offset value is randomly selected for use. Due to the positive bias of the relative transmission levels (+2.5, −1.5), this will insure a positive average transmission level value. If the occurrences, however, do not split relatively equally, then the offset resulting in the largest average transmission value is selected for use.

Figure 12:
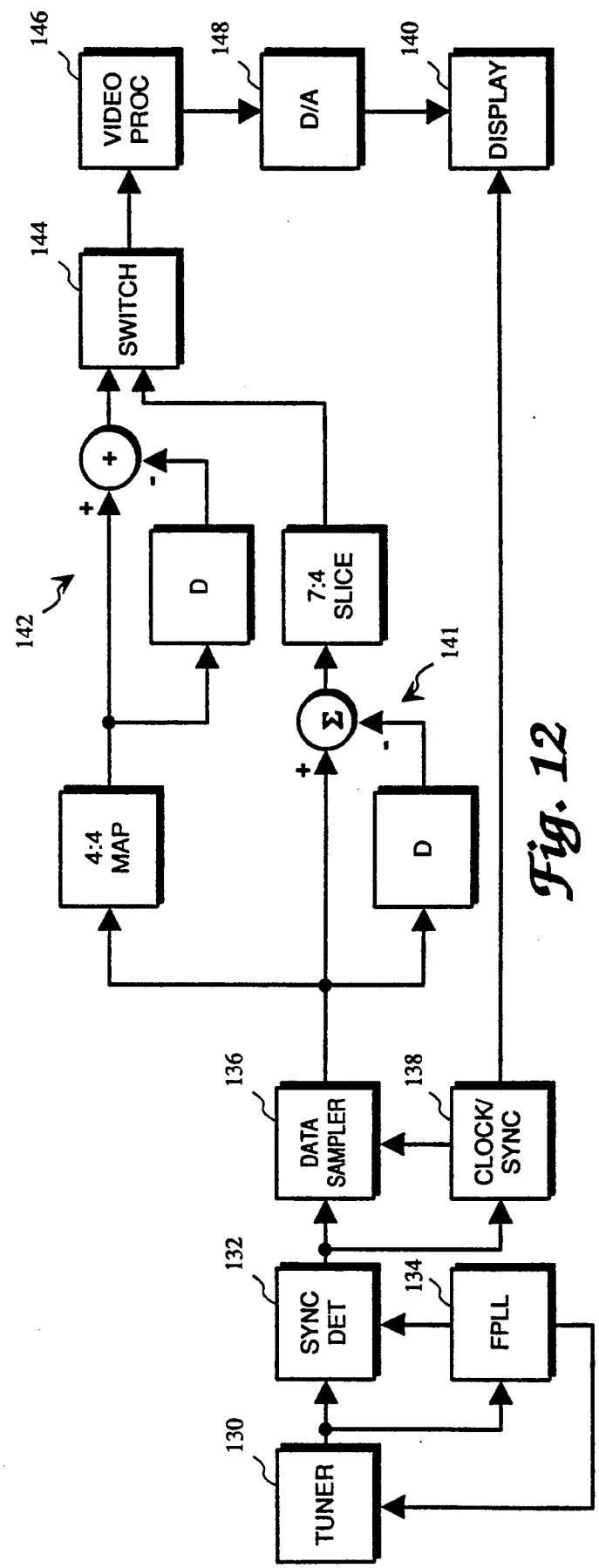
FIG. 12 is a block diagram of a television signal receiver constructed according to the invention.

With reference now to FIG. 12, the transmitted signal is received by a receiver including a tuner 130. Tuner 130 converts the received signal to an intermediate frequency (IF) signal which is applied to a synchronous detector 132 and to a frequency and phase locked loop (FPLL) 134. FPLL 134 locks to the applied IF signal and generates a continuous wave output for application to synchronous detector 132. FPLL 134 also generates an automatic frequency control voltage for controlling the operation of tuner 130. Synchronous detector 132, in response to the output of FPLL 134, demodulates the received signal and applies the demodulated signal to the inputs of a data sampler 136 and a clock and sync recovery circuit 138. Circuit 138 applies a clock signal to a second input of data sampler 136 and appropriate sync signals for controlling a display 140.

Figure 1K:
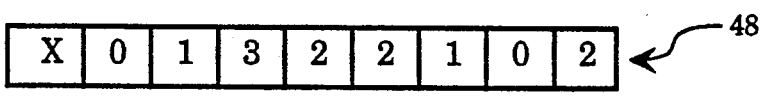
Figure 1L:
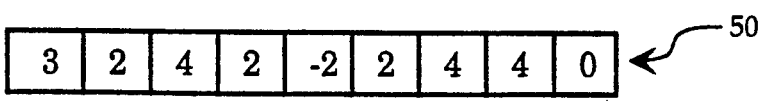
Figure 1M:
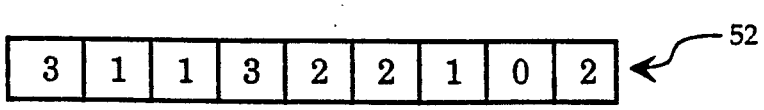

The output of data sampler 136 comprises the encoded data subsegments corresponding in form to either data segment 26 of FIG. 1F (in the case where no pilot is used during transmission) or data segment 28 of FIG. 1G (in the case where a pilot is used during transmission). In either event, the encoded data subsegments are applied to a linear postcoding filter 141 and a modulo-4 postcoding filter 142, both postcoding filters 141 and 142 having configurations complementary to the precoding filter used in the transmitter. Linear filter 141 corresponds to the filter shown in FIG. 4 except that the feedforward delay element is characterized by a twelve symbol delay while modulo-4 filter 142 corresponds to the filter shown in FIG. 6 with its delay element also being characterized by a twelve symbol delay. The outputs of both filters 141 and 142 are applied to a switch 144 which is operated for coupling one of the filter outputs to a video processor 146. It will be recalled that linear filter 141 is operable for reducing interfering NTSC co-channel components so that its output corresponding to data segment 36 of FIG. 11, is selected by switch 144 in the presence of such interference. In the absence of NTSC interference, the output of filter 142, corresponding to data segment 48 of FIG. 1K, is selected by switch 144 to provide improved signal to noise performance. In this regard, it will be observed that decoding of the precoded and carrier offset compensated data subsegments is fully performed by postcoding filters 141 and 142 without the need for providing any additional decoding circuitry. Finally, the decoded subsegments A–L are suitably processed by video processor 146, which discards offset symbols $A_0$–$L_0$, and applies the processed video signal through a D/A converter 148 to display 140.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing descriptions and accompanying drawings is offered by way of illustration only and not as a limitation. The actual scope of the invention is intended to be defined in the following claims when viewed in their proper perspective based on the prior art.

What is claimed is:

1. A method of processing a television signal comprising:
    providing a digital television signal comprising a plurality of subsegments each including a plurality of N-level symbols;
    establishing a relative transmission level for each of said N levels, said relative transmission levels including at least one level above and at least one level below a zero carrier level; and
    modulo-N offsetting the symbols of each of said subsegments by a factor selected for insuring that the average relative transmission level for the symbols of the respective subsegment is characterized by a positive value.

2. A method of processing a television signal comprising:
    providing a digital television signal comprising a plurality of subsegments each including a plurality of N-level symbols;
    establishing a relative transmission level for each of said N levels; and
    modulo-N offsetting the symbols of each of said subsegments by a factor selected for insuring that the average relative transmission level for the symbols of the respective subsegment is characterized by a positive value, wherein said relative transmission levels define an average pilot level and wherein said positive value exceeds a predetermined threshold which is less than or equal to said average pilot level.

3. The method of claim 2 wherein said predetermined threshold is equal to one-half said average pilot level.

4. The method of claim 1 wherein said modulo-N offsetting step comprises calculating the average relative transmission level symbol value of the N-level symbols of each of said subsegments for each of a plurality of offset factors O-(N−1).

5. The method of claim 4 wherein said relative transmission levels define an average pilot level and wherein said modulo-N offsetting step comprises calculating the distance between each of said average symbol values and said average pilot level.

6. The method of claim 5 wherein said modulo-N offsetting step comprises determining the smallest one of said distances associated with a positive one of said average symbol values and offsetting the symbols of the respective subsegment using the offset factor corresponding thereto.

7. The method of claim 6 wherein said determining step identifies more than one of said smallest distances and including randomly selecting an offset factor from among the offset factors corresponding to said more than one smallest distances for offsetting the symbols of the respective subsegment.

8. The method of claim 1 wherein N=4 and said relative transmission levels comprise −2.5, −0.5, 1.5 and 3.5.

9. The method of claim 1 wherein N=2 and said relative transmission levels comprise −1.5 and 2.5.

10. The method of claim 1 wherein said modulo-N offsetting step comprises randomly selecting said offset factor if the occurrences of the different levels of the symbols of the respective subsegment are relatively equally split.

11. The method of claim 10 wherein said offsetting step comprises, if said occurrences are not relatively equally split, calculating the average relative transmission level symbol value of the symbols of each of said subsegments for each of a plurality of offset factors O-(N−1), and using the offset factor corresponding to the largest one of said average values for offsetting the symbols of the respective subsegment.

12. A method of processing a television signal comprising:
providing a digital television signal comprising a plurality of subsegments each including a plurality of N-level symbols;
establishing a relative transmission level for each of said N levels, said relative transmission levels defining an average pilot level;
calculating for each of said subsegments the distance from said average pilot level of the average relative transmission level symbol value of the N-level symbols of the respective subsegments for each of a plurality of offset factors O-(N−1);
selecting the offset factor corresponding to the smallest one of said distances associated with a positive one of said average symbol values; and
using said selected offset factor to modulo-N offset the symbols of the corresponding subsegment.

13. The method of claim 12 wherein said selecting step comprises selecting the offset factor corresponding to the smallest one of said distances associated with said average symbol values greater than a threshold value, said threshold value being less than or equal to said average pilot level.

14. The method of claim 12 wherein, in the event that more than one of said offset factors is selected as corresponding to said smallest distance, randomly identifying an offset factor from among said selected offset factors for modulo-N offsetting the symbols of the corresponding subsegment.

15. The method of processing a television signal comprising: providing a digital television signal comprising a plurality of subsegments each including a plurality of N-level symbols;
establishing a relative transmission level for each of said N levels;
counting the occurrences of the different levels of the symbols of each of said subsegments;
randomly selecting an offset factor o-(N−1) if said occurrences for a respective subsegment are relatively equally split;
if said occurrences are not relatively equally split, calculating the average relative transmission level symbol value of the symbols of each of said subsegments for each offset factor o-(N−1) and selecting the offset factor corresponding to the largest one of said average values; and
modulo-N offsetting the symbols of each of said subsegments in accordance with the offset factor selected therefor.

* * * * *